2,956,061
PROCESS FOR THE PREPARATION OF MUREXINE

Claudio Pasini and Severina Coda, Milan, Italy, assignors to Società Farmaceutici Italia, a corporation of Italy No Drawing. Filed Apr. 28, 1958, Ser. No. 731,152

Claims priority, application France Apr. 30, 1957

14 Claims. (Cl. 260—309)

The present invention relates to a new process for the synthesis of "Murexine," i.e. β-4(5)-imidazyl-acryl-choline.

In U.S. Patent No. 2,744,117, filed on March 31, 1953, for a process for the commercial preparation of a new substance acting on the respiratory centers, the chemical nature of "Murexine," its activity on the neuro-muscular transmission, and a method for its synthesis are described. According to that method, which involves a multi-stage synthesis, 2-chloro-ethylic ester of α-chloro-β-imidazolyl-4(5)-propionic acid is reacted with trimethylamine, thus obtaining murexine chloride which is extremely hygroscopic. This compound, treated with a saturated picric acid solution, gives murexine dipicrate in the shape of yellow-orange needles, stable and scarcely soluble in water. In order to obtain murexine chloride hydrochloride, which is more suitable for therapeutic applications, murexine dipicrate is reacted with a suitable hydrochloride, for instance, 2,4-diguanidine-phenyl-lauryl ether dihydrochloride. By a double exchange reaction, a precipitate consisting of 2,4-diguanidine-phenyl-lauryl ether dipicrate is obtained, which is easily separated by filtration, murexine being recovered from the solution as murexine chloride-hydrochloride-monohydrate, a microcrystalline white powder.

The principal object of the present invention is as follows. It has now been found that murexine chloride-hydrochloride can be also obtained in an entirely new way by a much more rapid synthesis. Contrary to the preceding synthesis, it is not necessary to isolate the intermediate products, and the desired product is obtained in a single stage. Other advantages will be obvious to those skilled in the art from the following description.

According to the present invention, malonyl monochloride (I) is reacted with choline chloride (II) at ordinary temperature and pressure in a suitable solvent, thus obtaining monomalonyl choline chloride (III) as an intermediate product which it is not necessary to isolate. The said suitable solvent for this reaction stage should be an anhydrous liquid which does not react with malonyl monochloride, i.e. this liquid should not contain, in its molecule, any chemical groups capable of reacting with the strongly reactive COCl group present in malonyl monochloride.

Of the various organic solvents, the most suitable for this use, according to a preferred embodiment of the process of the present invention, is anhydrous ethyl ether. Obviously, other anhydrous ethers can be used without departing from the scope of the present invention.

The intermediate (III) is then reacted at mild temperatures, for instance at temperatures between 50 and 60° C., with 4(5)-formyl-imidazol (or 4-(5)-imidazyl-carboxy aldehyde) (IV) dissolved in a suitable solvent, in this case ethyl alcohol. However, the invention is not restricted to this temperature range, but there is no evident advantage in lowering the temperature or raising it.

By eliminating one molecule of water formed by the oxygen atom of the aldehyde group and the two hydrogen atoms of the malonic derivative, a condensation compound is obtained (with the formation of a new double bond) which has the structure of α-carboxyl-β-4(5)-imidazyl-acryl-choline chloride (V). This intermediate need not be separated for the purpose of the process. However, in order to improve the course of the condensation reaction, it is necessary to remove the water formed during this reaction, and this can be advantageously obtained by using an auxiliary inert solvent capable of fixing water in an azeotropic form. Anhydrous benzene is advantageous for this purpose.

In the last stage of the preparation, the intermediate (V) can be easily decarboxylated at moderate temperature in the presence of hydrochloric acid, thus obtaining murexine chloride-hydrochloride as a final product.

This is finally purified by a convenient method, for instance by washing with highly concentrated ethyl alcohol.

The starting compound, malonyl monochloride, is a very reactive and unstable substance which has been known in literature for a long time. It was obtained for the first time by Staudinger and Ott who described its properties and synthesis (B.41, 2208 (1908)).

The preparation method used by the aforementioned authors consisted of reacting thionyl chloride with malonic acid.

The yields, however, were very low and the product obtained contained some impurities. These impurities are very prejudicial, because their presence favors the decomposition of the monochloride which tends to disproportion itself into malonic acid and malonyl dichloride according to the following scheme:

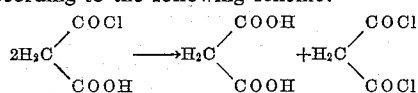

It has now been found that malonyl monochloride can be obtained with a good yield and good characteristics in respect to purity by reacting water carefully, in well defined amounts and conditions, with malonyl dichloride, which is easily prepared.

The partial hydrolysis of malonyl dichloride had been tried by various methods but it has always led to a mixture of malonic acid and the starting compound.

But if the amount of water, which is preferably strictly needed stoichiometrically, is introduced in the cold into a solution of malonyl dichloride in a suitable anhydrous and inert solvent, e.g. an ether, and said water is so introduced in the form of moisture entrained in an inert gas current, such as carbon dioxide, malonyl monochloride is obtained in good yields, and can be easily separated in the crystalline form.

Tthe other starting compound, choline chloride, is a known product and is to be used herein in the anhydrous state obtained by crystallization, as illustrated in the specific example below.

The compound 4-(5)-formyl-imidazol too is a known product and can be prepared by synthesis according to a method, described in literature, which too is illustrated in the following example.

The following reaction scheme illustrates the synthesis diagrammatically, the operative details being described below in the example, which presents a preferred embodiment.

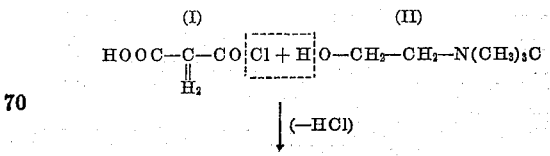

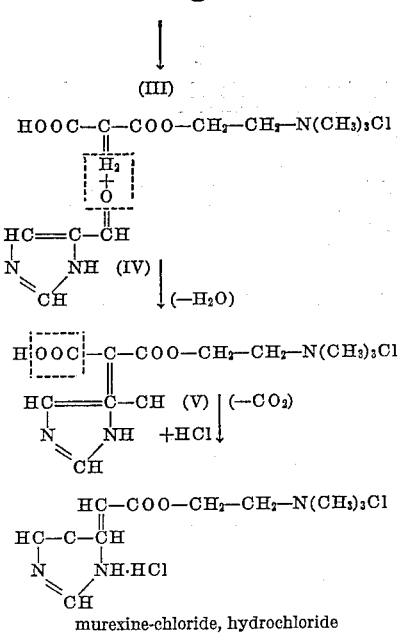

One important novel feature of the present invention is the reaction indicated in the first stage of the process, i.e. the reaction between malonyl monochloride and choline chloride. This reaction has not been described in the chemical literature so far. This reaction leads, stoichiometrically, to the formation of the intermediate (III) (chloride of monomalonyl choline) which is a new compound not described heretofore.

The intermediate compound V (α-carboxyl-β-4(5)-imidazyl-acryl-choline chloride is also new.

Another important advantage of the process according to the present invention resides in the fact that entirely synthetic products are used as starting or intermediate compounds. Recourse to histidine derivatives is not required. This is not the case for the synthesis described in the aforementioned U.S. patent.

Finally, another advantage of the process according to the present invention lies in the fact that a final product is obtained which can be directly isolated in the crystalline state from the reaction liquid in which it has been formed, without having to precipitate it as an insoluble salt (e.g. as a picrate) which requires further transformation into a water-soluble product.

A detailed example of embodiment of the process for preparing murexine chloride-hydrochloride of the present invention is given, without limitation of the scope of the invention.

Example

The required malonyl monochloride is prepared as follows: 20 g. of malonyl dichloride, prepared essentially according to Chittarangian Raha (Org. Synth. 33, 20) and freshly rectified, are dissolved in 100 ml. of anhydrous ethyl ether in a flask provided with a stirrer, a reflux condenser and a $CaCl_2$ trap and a feeding pipe whose outlet is submerged in the liquid (outer diameter 8 mm., inner diameter 1.5 mm). The feeding pipe is connected with an inert gas bottle, e.g. of $CO_2$ through a Drechsel bottle, into which 2.55 ml. of water have been introduced.

Stirring is started and a vigorous gas current is passed through, which in the Drechsel bottle is charged with moisture. The evaporation of ether, caused by the passage of the gas, serves to keep sufficient cooling.

The operation requires several hours. Small amounts of ether are added from time to time, if necessary, so that at the end of the operation, i.e. when all of the water in the Drechsel bottle is evaporated, the liquid in the flask amounts to 50–60 ml.

50–60 ml. of anhydrous chloroform are added while stirring, whereby a small amount of crystalline malonic acid may be separated.

The mixture is quickly filtered through a well-dried porous plate filter and the filtrate is diluted with 3–4 volumes of petroleum ether. By cooling to −30° C., there takes place the separation of malonyl monochloride in the shape of white, slightly yellowish needles having a melting point of 65–67° C. The yield is 50–60%. The liquid still contains considerable amounts of malonyl monochloride and may be employed as it is, whenever it is not necessary to use a perfectly pure solution of this compound.

The anhydrous choline chloride needed for the first stage of the reaction is crystallized as follows: 10 g. of choline chloride, carefully dried on $P_2O_5$, are dissolved in 120 ml. of warm absolute alcohol.

The warm solution is poured as a thin jet into 500 ml. of petroleum ether while stirring vigorously. A precipitate consisting of very thin needles is formed, which are filtered, washed with petroleum ether, without compressing them, and are dried on $H_2SO_4$ under vacuum. The product is a soft (scarcely compact) mass of crystals.

Into a small 3-necked flask, provided with a stirrer and a $CaCl_2$ trap, 5.5 g. of freshly prepared malonyl monochloride, 4.6 g. of choline chloride and 15 ml. of anhydrous ether are quickly introduced. Stirring is continued for 15–20 minutes, thus obtaining a more or less fluorescent viscous homogeneous liquid which adheres to the flask bottom and a layer of ether saturated with dry HCl which is released during the reaction. The ether layer is decanted and the viscous residue is washed twice while agitating, each time with 15 ml. of anhydrous ether for 10 minutes.

The small flask is heated on a 60° C. water-bath, and a warm solution of 3 g. of 4(5)-formyl-imidazol (essentially prepared according to Pyman, J. Chem. Soc. 109, I, 192 (1916)) in 7 ml. of alcohol and 1 ml. of conc. HCl is added to the flask.

After a few minutes, the mixture assumes the appearance of a homogeneous liquid having orange color. The water-bath is removed and 30 ml. of anhydrous benzene are added while stirring. When stirring is stopped, two layers are formed; the upper (benzenic) layer is separated and eliminated.

The remaining orange liquid, after addition of 30 ml. of anhydrous benzene, is slowly distilled on a water-bath until no more liquid passes over.

On the flask bottom remains a viscous residue which slowly transforms (within some hours or, more often, some days) into a crystalline magma which, after careful treatment with 99% ethyl alcohol and filtering, gives murexine-chloride-hydrochloride in the form of a white crystalline powder, which melts at 231–233° C. with decomposition.

We claim:

1. In a process of preparing a salt of β-4(5)-imidazyl-acrylic ester of choline chloride, the steps comprising reacting malonyl monochloride with choline chloride in an anhydrous non-reactive liquid medium, thus forming monomalonyl choline chloride as intermediate present in the reaction mixture, treating said reaction mixture with 4(5)-formylimidazol in an organic solvent, removing the water formed in the reaction and decarboxylating the α-carboxyl-β-4(5)-imidazyl-acrylic ester of choline chloride produced by heating in the presence of acid.

2. In a process of preparing a salt of β-4(5)-imidazyl-acrylic ester of choline chloride, the steps comprising reacting malonyl monochloride with choline chloride in anhydrous ethyl ether, thus forming monomalonyl choline chloride as intermediate present in the reaction mixture, treating said reaction mixture with 4(5)-formyl-imidazol in ethyl alcohol, removing the water formed in the reaction and decarboxylating the α-carboxyl-β-4(5)-imidazyl-acrylic ester of choline chloride produced by heating in the presence of acid.

3. A process of preparing the hydrochloride of β-4(5)-imidazyl-acrylic ester of choline chloride, comprising reacting malonyl monochloride with choline chloride in an anhydrous non-reactive liquid medium, thus forming monomalonyl choline chloride as intermediate present in the resulting reaction mixture, treating said reaction mixture at 50 to 60° C. with 4(5)-formyl-imidazol in alcohol in the presence of hydrochloric acid, adding an auxiliary inert organic solvent forming a minimum boiling point azeotrope with the water formed in the reaction and distilling off the liquid.

4. A process of preparing the hydrochloride of β-4(5)-imidazyl-acrylic ester of choline chloride, comprising reacting malonyl monochloride with choline chloride in an anhydrous non-reactive liquid medium, thus forming monomalonyl choline chloride as intermediate present in the resulting reaction mixture, treating said reaction mixture with 4(5)-formyl-imidazol in alcohol in the presence of hydrochloric acid, adding benzene, and distilling off the liquid.

5. A process of preparing α-carboxyl-β-4(5)-imidazyl-acrylic ester of choline chloride comprising reacting malonyl monochloride with choline chloride in an anhydrous non-reactive liquid medium, thus forming monomalonyl choline chloride as intermediate present in the resulting reaction mixture, treating said reaction mixture with 4(5)-formyl-imidazol in an organic solvent, and removing the water formed in the reaction.

6. In a process of preparing a mineral acid salt of β-4(5)-imidazyl-acrylic ester of choline chloride, the improvement comprising reacting monomalonyl choline chloride with 4(5)-formyl-imidazol in an organic solvent, removing the water formed in the reaction and decarboxylating the resulting α-carboxyl-β-4(5)-imidazyl-acrylic ester of choline chloride by heating in the presence of a mineral acid.

7. The process of preparing the hydrochloride of β-4(5)-imidazyl-acrylic ester of choline chloride comprising reacting monomalonyl choline chloride with 4(5)-formyl-imidazol in an organic solvent, removing the water formed in the reaction and decarboxylating the resulting α-carboxyl-β-4(5)-imidazyl-acrylic ester of choline chloride by heating in the presence of hydrogen chloride.

8. A process of preparing the hydrochloride of β-4(5)-imidazyl-acrylic ester of choline chloride, comprising reacting malonyl monochloride with choline chloride in an anhydrous non-reactive liquid medium, thus forming monomalonyl choline chloride as intermediate present in the reaction mixture, treating said reaction mixture with 4(5)-formyl-imidazol in an organic solvent, removing the water formed in the reaction and decarboxylating the α-carboxyl-β-4(5)-imidazyl - acrylic ester of choline chloride produced by heating in the presence of hydrochloric acid.

9. A process of preparing the hydrochloride of β-4(5)-imidazyl-acrylic ester of choline chloride, comprising reacting malonyl monochloride with choline chloride in an anhydrous non-reactive liquid ether medium, thus forming monomalonyl choline chloride as intermediate present in the reaction mixture, treating said reaction mixture with 4(5)-formyl-imidazol in an alcohol medium, removing the water formed in the reaction and decarboxylating the α-carboxyl - β-4(5)-imidazyl-acrylic ester of choline chloride produced by heating in the presence of hydrochloric acid.

10. A process for preparing murexine-chloride-hydrochloride (β-4(5)-imidazyl-acrylic ester of choline chloride, hydrochloride), in which malonyl monochloride is reacted in the cold with choline chloride in an anhydrous inert solvent, and the reaction mixture is reacted with 4(5)-formyl-imidazol in the presence of an organic solvent, to which another solvent is added having a low boiling point and capable of forming an azeotrope with the water of reaction, hydrochloric acid being added, murexine-chloride-hydrochloride being obtained after eliminating the water and carbon dioxide formed.

11. A process according to claim 10, characterized by the use of a liquid having a low boiling point, incapable of reacting with the acid chlorides, namely anhydrous ethyl ether, as the inert, anhydrous solvent for the first stage of the reaction.

12. A process according to claim 10, characterized by the use of anhydrous benzene as the solvent having a low boiling point, for the last reaction stage, and one capable of forming an azeotrope with water.

13. The compound, monomalonyl choline, being of the formula:

$$\text{HOOC—CH}_2\text{—COO—CH}_2\text{—CH}_2\text{—N(CH}_3)_3\text{Cl}$$

14. The compound, α-carboxyl-β-4(5)-imidazyl-acrylic ester of choline chloride.

References Cited in the file of this patent
UNITED STATES PATENTS 2,684,981    Sherman _____ July 27, 1954
2,744,117    Erspamer _____ May 1, 1956

OTHER REFERENCES

Staudinger: Ber. Deut. Chem., vol. 41, pages 2208–14 (1908).

Baeyer: Beilstein (Handbuch, 4th Ed.), vol. 4, p. 281 (1922).